(12) United States Patent
Simionescu

(10) Patent No.: US 8,656,059 B2
(45) Date of Patent: Feb. 18, 2014

(54) METHODS FOR EXCHANGING ADMINISTRATIVE INFORMATION THROUGH A COMMUNICATION INTERFACE WITH LIMITED ADMINISTRATIVE INFORMATION EXCHANGE FEATURES

(75) Inventor: Horia Cristian Simionescu, Foster City, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/484,924

(22) Filed: May 31, 2012

(65) Prior Publication Data

US 2013/0275627 A1    Oct. 17, 2013

Related U.S. Application Data

(63) Continuation-in-part of application No. 13/446,471, filed on Apr. 13, 2012.

(51) Int. Cl.
*G06F 3/00* (2006.01)
(52) U.S. Cl.
USPC .................................................. 710/5; 710/8
(58) Field of Classification Search
None
See application file for complete search history.

(56) References Cited

U.S. PATENT DOCUMENTS 7,747,788 B2 *   6/2010   Chang et al. ..................... 710/5

OTHER PUBLICATIONS

Intel, Serial ATA II Native Command Queueing Overview, Apr. 2003, All pages.*

* cited by examiner

*Primary Examiner* — Idriss N Alrobaye
*Assistant Examiner* — David Martinez
(74) *Attorney, Agent, or Firm* — Duft Bornsen & Fettig

(57) ABSTRACT

Methods and structure for transferring administrative information through a communication interface. Features and aspects hereof provide for exchanging administrative information between an initiator device and a target device using read and write commands encoded with a reserved sub-tag value. In the context of a Serial Advanced Technology Attachment (SATA) system, a portion of a parameter (e.g., the LBA parameter) of a read or write command (a Native Command Queuing command) is defined to encode a sub-tag value. One or more sub-tag values are reserved to indicate that the corresponding read or write command is related to the exchange of administrative information rather than the reading or writing of data on a storage device. A parameter value encoded in the LBA field or data length field of the read or write command indicates administrative data to be returned to the initiator or to be updated within the target device.

16 Claims, 5 Drawing Sheets

METHODS FOR EXCHANGING ADMINISTRATIVE INFORMATION THROUGH A COMMUNICATION INTERFACE WITH LIMITED ADMINISTRATIVE INFORMATION EXCHANGE FEATURES

This patent application claims priority as a Continuation in Part of U.S. patent application Ser. No. 13/446,471 filed 13 Apr. 2012 and entitled METHODS AND STRUCTURE FOR TRANSFERRING ADDITIONAL PARAMETERS THROUGH A COMMUNICATION INTERFACE WITH LIMITED PARAMETER PASSING FEATURES.

BACKGROUND

1. Field of the Invention

The invention relates generally to communication protocols and more specifically relates to improvements to allow exchange of administrative information when using a communication protocol with limited features for such exchanges.

2. Discussion of Related Art

A wide variety of communication media and protocols are in use for communicating between two devices. For example, in the context of storage systems, storage controllers or host systems often communicate with storage devices and systems using parallel communication media and protocols such as parallel SCSI and parallel Advanced Technology Attachment (PATA). Or, for example, Serial Attached SCSI (SAS), Fibre Channel (FC), and Serial Advanced Technology Attachment (SATA) may be used in such storage system communication applications.

In such storage applications, it is common to send read and write commands from a host/controller to a storage device or system to retrieve previously stored data from storage and to send new write data to storage. Such commands often require a number of parameters be supplied for the read/write command. For example, a location from which data is to be read or a location to which data is to be written may be provided as a parameter of the read/write command. Or, for example, the length of data to be read or written may be provided as a parameter of the command.

Many such protocols were designed for particular expected parameters to be provided as part of "standard" read and write commands. Often such protocols are designed to allow for some expansion of the number or types of parameters that may be provided with a command. However, as the design and capabilities of new devices advance and develop over time, new parameters may be required in the exchange of commands and data. For example, PATA communication systems were designed with specific parameters common to earlier storage devices. The protocol generally provides for parameter values to be provided corresponding to particular "registers" of the storage device to be accessed (e.g., a "register file" is defined where particular expected parameters are programmed by commands of the PATA protocol addressing particular registers of the storage device. SATA protocols built from that legacy and transmit similar commands and associated parameters over serial communication media rather than parallel bus structures.

PATA and SATA are exemplary of communication protocols where the number and types of parameters that may be provided with read/write commands are limited—limited by the register file definitions that first arose with early designs of storage devices. Some newer storage devices may require additional information to effectuate desired read or write operations. For example, some newer solid-state drives (SSDs using flash memory components for storage of data in a structure analogous to rotating magnetic/optical disk drives) may require additional parameters for read/write command processing than are available in the SATA (or PATA) protocols. In general, SSDs use a mapping structure to map logical block addresses (LBAs) for read/write commands into corresponding physical block addresses (PBAs) identifying physical storage locations in the flash memory components of the SSD. The mapping information in some SSDs is stored in a memory component within the SSD (e.g., a non-volatile RAM component or in a flash memory component).

The mapping structures used can be complex due to the nature of flash memory controllers and the design of SSDs using a plurality of flash memory chips. SSD designs may organize the flash memory chips in various architectures to achieve better performance through parallelism in access to various combinations of flash memory chips. These complexities lead to related complexity of the mapping tables and algorithms. As the capacity of SSDs has grown in recent designs, these mapping structures may be quite large and the algorithms for use of the mapping structures can be quite complex. These complexities tend to increase the costs and complexity of SSD devices.

Some newer SSD designs offload responsibility for mapping algorithms and related structures to attached host system/controllers to reduce the cost and complexity of the SSD device per se. In such newer SSD designs with offloaded mapping responsibilities, read and write commands from the host/controller to the SSD may require additional parameters. For example, the host/controller, having performed the requisite mapping from LBA to PBA, may be required to transmit both the LBA and the PBA for data to be read from or written to the newer SSD.

SATA protocols used with such newer SSDs present a problem in that the SATA protocol has strictly defined limits on the number of parameters that may be encoded in a read or write command. Other devices may give rise to similar problems for SATA protocols. Further, other protocols that have limited or no expandability for providing parameters to be associated with commands transferred from the host/controller to a device may present similar problems for some devices. Thus it is an ongoing challenge to efficiently provide additional parameters for commands from a host/controller to a device where the protocol employed has limited expandability to provide additional parameters.

Further, some protocols such as SATA are limited in their ability to exchange status/configuration data (e.g., "administrative information") between devices. The protocol may provide only limited commands for such administrative information exchanges and the use of the defined, limited commands may impose performance problems on exchanges between the devices. Thus, it is also an ongoing challenge to improve the exchange of administrative information (e.g., status and/or configuration information) between devices in protocols that impose limitations for the exchange of administrative information such as the SATA protocol.

SUMMARY

The present invention solves the above and other problems, thereby advancing the state of the useful arts, by providing methods for exchanging administrative information between an initiator device and a target device in a protocol that limits such exchanges. Read and/or write commands may be transmitted from the initiator to the target specifying a reserved sub-tag value to indicate that administrative information is to be exchanged (rather than the transfer of user data such as to or from a storage device). A read command with a reserved sub-tag value may be used to return administrative information from the target device to the initiator device. A write command with a reserved sub-tag value may be used to update or modify administrative information (e.g., configuration data) of the target device.

In one aspect hereof, a method is provided that is operable in a system comprising an initiator device and a target device. The method exchanges administrative information between the initiator device and the target device. The method comprises transmitting, from the initiator device to the target device, a command comprising a reserved tag value and indicia of administrative information to be exchanged between the initiator device and the target device and receiving the command in the target device. The method then detects within the target device that the command comprises a reserved tag value. Responsive to detecting that the command comprises a reserved tag value, the method exchanges the administrative information indicated in the command.

Another aspect hereof provides a method operable in a SATA target device. The method comprises receiving a SATA read command or a SATA write command from a SATA initiator device and detecting a reserved sub-tag value encoded within the received command. Responsive to detecting the reserved sub-tag value in a received SATA read command, the method returns administrative information relating to the target device to the initiator. Responsive to detecting the reserved sub-tag value in a received SATA write command, the method configures the target device based on administrative information encoded within the received SATA write command.

DETAILED DESCRIPTION OF THE DRAWINGS

Figure 1:
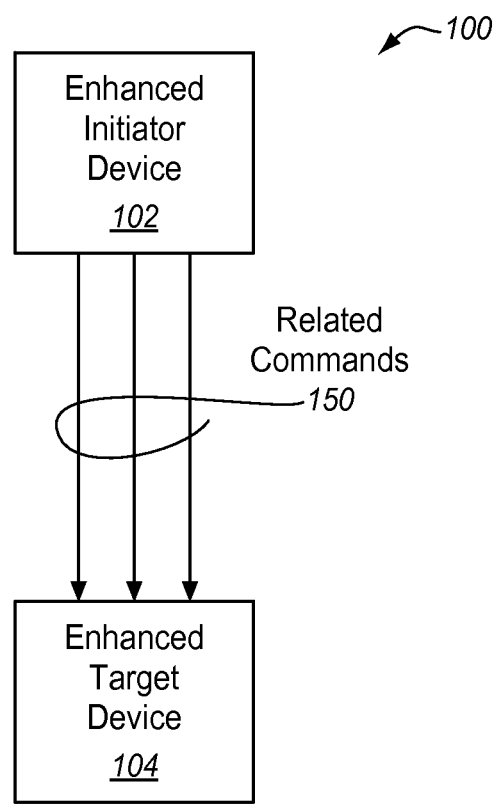
FIG. 1 is a block diagram of an exemplary system with an initiator and target both enhanced in accordance with features and aspects hereof to provide additional parameters to the target device in a protocol that limits the parameters for commands.

FIG. 1 is a block diagram of an exemplary system 100 enhanced in accordance with features and aspects hereof to provide for encoding of additional parameters beyond those provided in a particular communication medium and protocol. System 100 comprises enhanced initiator device 102 coupled with enhanced target device 104. Initiator device 102 may comprise any suitable system or component adapted for generating I/O requests or other appropriate messages directed to target device 104. Target device 104 comprises any suitable system or component adapted for receiving and processing I/O requests or other appropriate messages transmitted from initiator device 102. Initiator device 102 and target device 104 may be coupled by any suitable communication medium and protocol. As noted above, a wide variety of such communication media and protocols provide for a limited number and/or types of parameters encoded within a command or message. For example, in the SATA protocol, a read or write command has limited parameters that may be specified in accordance with the protocol. For example, the length of the data to be transferred by the SATA read or write command and a starting address (e.g., logical block address—LBA) may be specified as parameters of the SATA read or write command but no other parameters such as may be useful in communicating with an SSD that relies on the host/controller to provide mapping information.

In accordance with features and aspects hereof, a sequence of related commands 150 may be transmitted from initiator device 102 to target device 104. One or more initial commands of commands 150 may be transmitted and encoded in such a manner as to indicate that they are merely providing one or more additional parameters for a data transfer command yet to be transmitted. Following transmission of the one or more additional parameters in each of one or more initial commands from initiator device 102, the actual data transfer command or message may be generated and transmitted from the initiator to the target. In some exemplary embodiments, a tag or sub-tag value may be encoded in a portion of the command to associate each initial command with one another and with the associated data transfer command. For example, all initial commands and the associated data transfer command may share a common value for the tag/sub-tag field or, for example, the tag or sub-tag values may share some other common value or indicium that relates the various initial commands and the data transfer command. In some exemplary embodiments, the initial commands may be encoded as data transfer commands (e.g., read or write command) with a zero data transfer length parameter to indicate that parameters of the initial command represent additional parameters for a data transfer command yet to be received. The data transfer command of commands 150 (e.g., a read or write command) is then received from initiator device 102. As noted, the data transfer command may be associated with the corresponding initial commands by use of related tag/sub-tag values encoded within the commands. Further, in some embodiments, the data transfer command may be distinguished from the one or more initial commands by virtue of having a non-zero data transfer length or in any other suitable manner. When the data transfer command is received in target device 104, the one or more additional parameters encoded within any initial commands having the same tag/sub-tag value as the data transfer command may be utilized in executing the data transfer command. Thus, additional parameters are communicated from initiator device 102 to target device 104 despite the limitations of the underlying protocol in use.

In one exemplary embodiment as applied to the SATA protocol, each of the one or more initial commands is encoded as a SATA read or write command having a zero data transfer length. Any suitable command may be used that does not transfer read or write data but merely serves as a vehicle to transfer an additional parameter for a yet to be received data transfer command. Each such initial command (SATA command) may comprise one or more additional parameters encoded within the LBA parameter field of the initial command. Further, the tag/sub-tag value may be encoded in a subset of the bits representing the LBA parameter field while other parameter values may be encoded in other bits of the LBA parameter field. In one particular exemplary embodiment where the target device is a SATA solid-state drive (SSD) and where the SSD relies on the SATA host (e.g., initiator device 102) to perform logical to physical mapping operations on behalf of the SSD, the physical block address (PBA) determined by the host as corresponding to the LBA of a data transfer command may be encoded in bits of the LBA field of an initial command. Thus, the SSD may receive a first initial command having a first parameter encoded therein where the first parameter comprises the PBA and may further comprise a sub-tag value. This initial command may be identified as such by virtue of having a zero data transfer length in the SATA read or write command. The PBA parameter so encoded may be saved in the SSD in association with the sub-tag value also encoded within the LBA parameter field. A subsequent actual data transfer command received by the SSD (e.g., a SATA read or write command with a non-zero data transfer length) may then be executed utilizing the LBA parameter encoded within the LBA parameter field of the data transfer command in conjunction with the PBA parameter encoded within the LBA field of a previously received initial command. By associating the data transfer command with the corresponding initial command through the use of the common sub-tag values, the LBA parameter and PBA parameter generated by mapping operations of the initiator device may be utilized in executing the desired data transfer command. In this exemplary SSD embodiment, it is not necessary that the initial command immediately precede the data transfer command. Other commands may intervene. Rather, the sub-tag value in each of the two commands allows the SSD to associate the additional parameters (PBA) of the initial command with the standard parameters (LBA) of the data transfer command. Further, SATA Native Command Queuing (NCQ) features may be employed in the encoding of the initial command(s) and the data transfer command to allow multiple commands to be received by the SATA SSD and to associate them within the SATA device based on the common sub-tag values encoded in the commands. Similar features may be employed in other protocols to allow the target device to associate any additional parameters encoded in one or more previously received initial commands with a corresponding data transfer command and its standard encoded parameters.

In another exemplary embodiment, the sub-tag value of a command may be encoded with a reserved value to indicate other vendor specific features are to be employed. Utilizing similar read/write NCQ commands, the sub-tag value may be encoded to a reserved value such as −1 (all ones in the bits reserved for the sub-tag value). In such a case, the sub-tag value is used not to indicate a relationship with other similarly tagged commands but rather indicates that a particular vendor specified action is to be taken. For example, where a read command is transmitted from initiator 102 to target 104 having a reserved sub-tag value, the other parameters of the read command may specify a value or status of the target device that is to be returned to the initiator (rather than an address and length of data to be returned such as from a storage device as a target). The parameter values of the read command may, for example, request the return of a present status value or configuration parameter value of the target device. In the context of a SATA embodiment, the LBA parameter and/or length parameter of a read command having a reserved sub-tag value may indicate particular one or more status values and/or configuration values to be returned to the initiator device. In like manner, a SATA NCQ write command having a reserved value as its sub-tag value may provide one or more configuration values to be written to the target device to alter its configuration or operation. By use of such SATA NCQ read/write commands, status and configuration information may be exchanged between the initiator 102 and target 104 without the restrictions associated with non-NCQ commands. Those of ordinary skill in the art will recognize that any number of such reserved sub-tag values may be defined as required for a particular application and that the reserved values may be any non-zero values.

Exemplary additional details of the operation of initiator device 102 and target device 104 are discussed further herein below with respect to other figures. Those of ordinary skill in the art will readily recognize numerous additional and equivalent elements that may be present in a fully functional system 100, in initiator device 102, and in target device 104. Such additional and equivalent elements are omitted herein for simplicity and brevity of this discussion.

Figure 2:
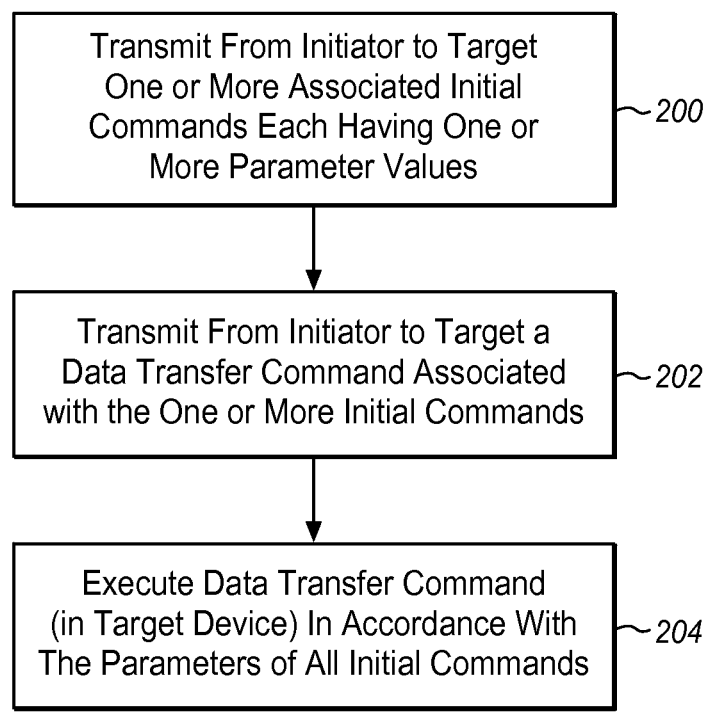
FIGS. 2 through 4 are flowcharts describing exemplary methods in accordance with features and aspects hereof to provide additional parameters to the target device in a protocol that limits the parameters for commands.

FIG. 2 is a flowchart describing an exemplary method in accordance with features and aspects hereof to provide additional parameters beyond those that may be encoded within a standard command or message transmitted from an initiator device to a target device in accordance with a particular communication medium and protocol. The method of FIG. 2 may be performed within a system such as system 100 of FIG. 1 and more specifically may be performed within enhanced initiator device 102 and enhanced target device 104. At step 200, one or more initial commands are generated by the initiator device and transmitted from the initiator device to the target device. Each of the one or more initial commands has one or more additional parameter values encoded therein. In some exemplary embodiments, a tag or sub-tag value may be used to identify each initial command as such and to associate the one or more initial commands with each other and with a yet to be received data transfer command. In some exemplary embodiments, each initial command may be a read or write command in accordance with the utilized protocol and may be identifiable as an initial command by virtue of having a zero data transfer length. Other suitable indicia may be employed to identify the initial command as such as distinguished from an actual data transfer command. Step 202 then transmits a desired data transfer command from the initiator to the target. In some exemplary embodiments, the data transfer command may be distinguished from an initial command by a particular command encoding, by a particular tag or sub-tag value encoded therein, or by any other suitable indicia. In some exemplary embodiments, the data transfer command may be distinguished from the initial commands in that it has a non-zero data transfer length (e.g., a read or write command having identified a quantity of data to be transferred to or from the target device). At step 204, having received the one or more initial commands and the actual data transfer command, the target device executes the data transfer command in accordance with the parameters of all the initial commands received and associated with the data transfer command (and in accordance with the parameters of the actual data transfer command). In some exemplary embodiments, the initial commands and the data transfer command may be associated by virtue of being received in sequence from a single initiator device. In other exemplary embodiments, tag/sub-tag values or other suitable indicia may be encoded within each of the one or more initial commands and in the data transfer command to allow the target device to associate various commands by virtue of having common tag/sub-tag values.

Figure 3:
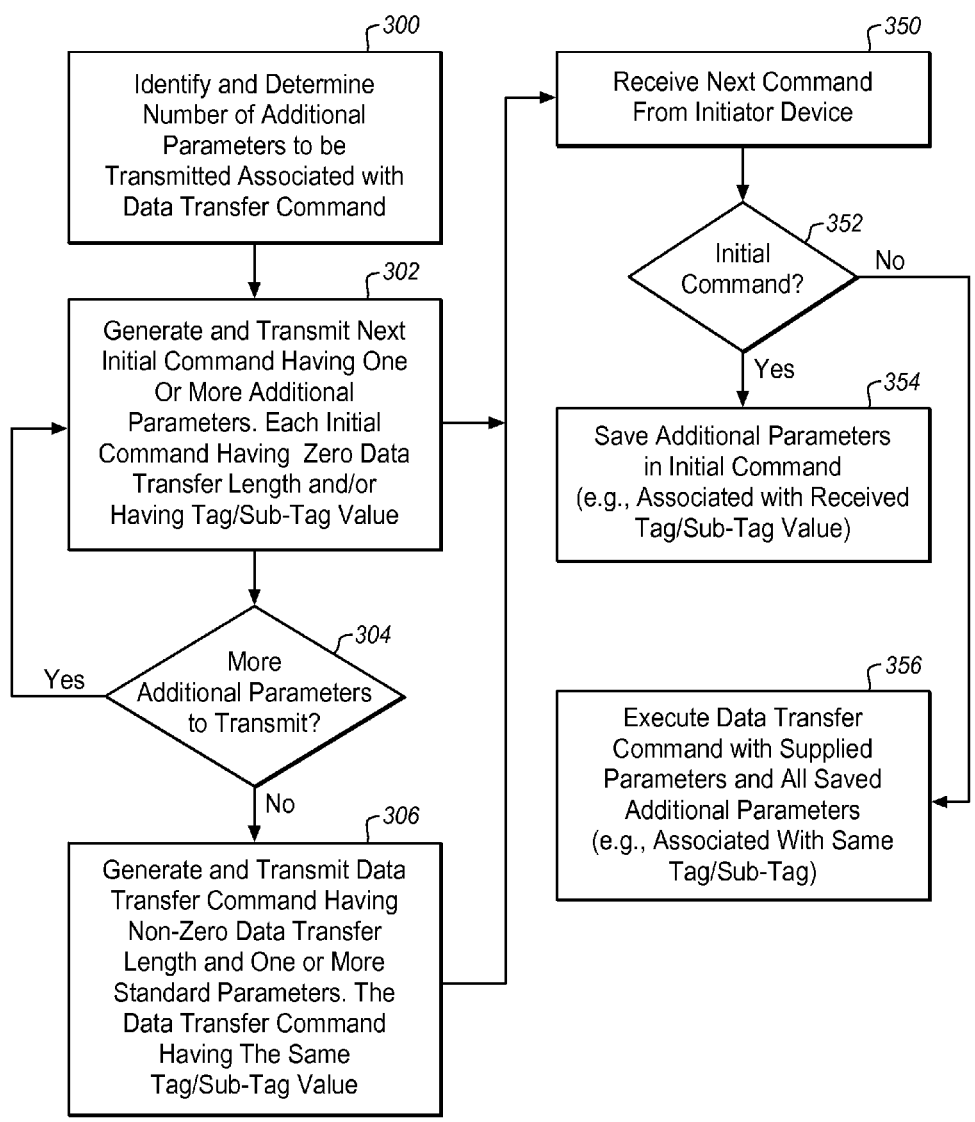

FIG. 3 is a flowchart describing another exemplary method in accordance with features and aspects hereof to provide additional parameters beyond those that may be encoded within a standard command or message transmitted from an initiator or target device in accordance with a particular protocol. The method of FIG. 3 may be performed within a system such as system 100 of FIG. 1 and more specifically may be performed within enhanced initiator device 102 and enhanced target device 104. Steps 300 through 306 represent processing within the initiator device while steps 350 through 356 represent associated processing within the target device. Steps 300 through 306 represent processing of the initiator device to generate appropriate commands for a desired read/write operation to the target device. At step 300, the initiator device identifies additional parameters to be transmitted for a given operation and determines the number and/or types of such additional parameters to be transmitted to the target device and associated with a data transfer command yet to be transmitted. Based on the number and types of parameters that may be encoded within a command in accordance with the employed protocol, step 300 may determine how many initial commands may be required to encode the identified additional parameters required for execution of the desired data transfer command. Step 302 then generates and transmits to the target device a next initial command (as indicated by the dashed line directed to step 350). Each initial command has one or more additional parameters of the identified additional parameters encoded therein. Further, in some exemplary embodiments, the generated and transmitted next initial command may be encoded as a data transfer command having a zero data transfer length to thereby identify the command as an initial command having additional parameters rather than as an actual data transfer command to be executed. In some exemplary embodiments, the initial command may further comprise a tag or sub-tag value common to all of the generated initial commands associated with the particular, desired actual data transfer command. Use of the common tag or sub-tag value allows the receiving target device to associate the one or more initial commands with the corresponding data transfer command yet to be received. Having generated and transmitted a next initial command, step 304 determines whether further additional parameters remain to be encoded within yet another initial command. If so, processing continues looping back to step 302 to generate and transfer a next initial command. If not, step 306 generates and transmits the desired data transfer command having a non-zero data transfer length (as indicated by the dashed line directed to step 350). The non-zero data transfer length corresponds to the length of the actual data to be transferred and may further serve to distinguish the actual data transfer command (e.g., read or write command) from the one or more initial commands providing additional parameters. Further, the generated and transmitted data transfer command has the same tag or sub-tag value utilized in each of the one or more initial commands to thereby permit the target device to associate the data transfer command with the one or more initial commands having additional parameters encoded therein for execution of the data transfer command by the target device.

Steps 350 through 356 represent corresponding processing within the target device responsive to receipt of each of the commands from the initiator device. At step 350 the target device receives a next command from the initiator device. Step 352 then determines whether the received command is an initial command. In some exemplary embodiments, the command may be identified as an initial command based on a tag or sub-tag value encoded in the command. In other exemplary embodiments, the command may be identified as an initial command by virtue of having a zero data transfer length (while an actual data transfer command has a non-zero data transfer length). If the received command is an initial command providing additional parameters for the eventual receipt of a corresponding actual data transfer command, step 354 saves the additional parameters encoded within the received initial command. The additional parameters may be saved in any suitable manner within the target device. In some embodiments, a memory component within the target device may be employed to save the additional parameters and to associate them with the tag or sub-tag value for later retrieval. If step 352 determines that the received command is not an initial command but rather an actual data transfer command (e.g., a read or write command having a non-zero data transfer length), step 356 executes the data transfer command utilizing any parameters specified within the data transfer command (e.g., standard parameters encoded within the data transfer command in accordance with the employed protocol) and utilizing all saved additional parameters encoded within previously received initial commands (and associated with the data transfer command by virtue of sharing a common tag or sub-tag value).

Figure 4:
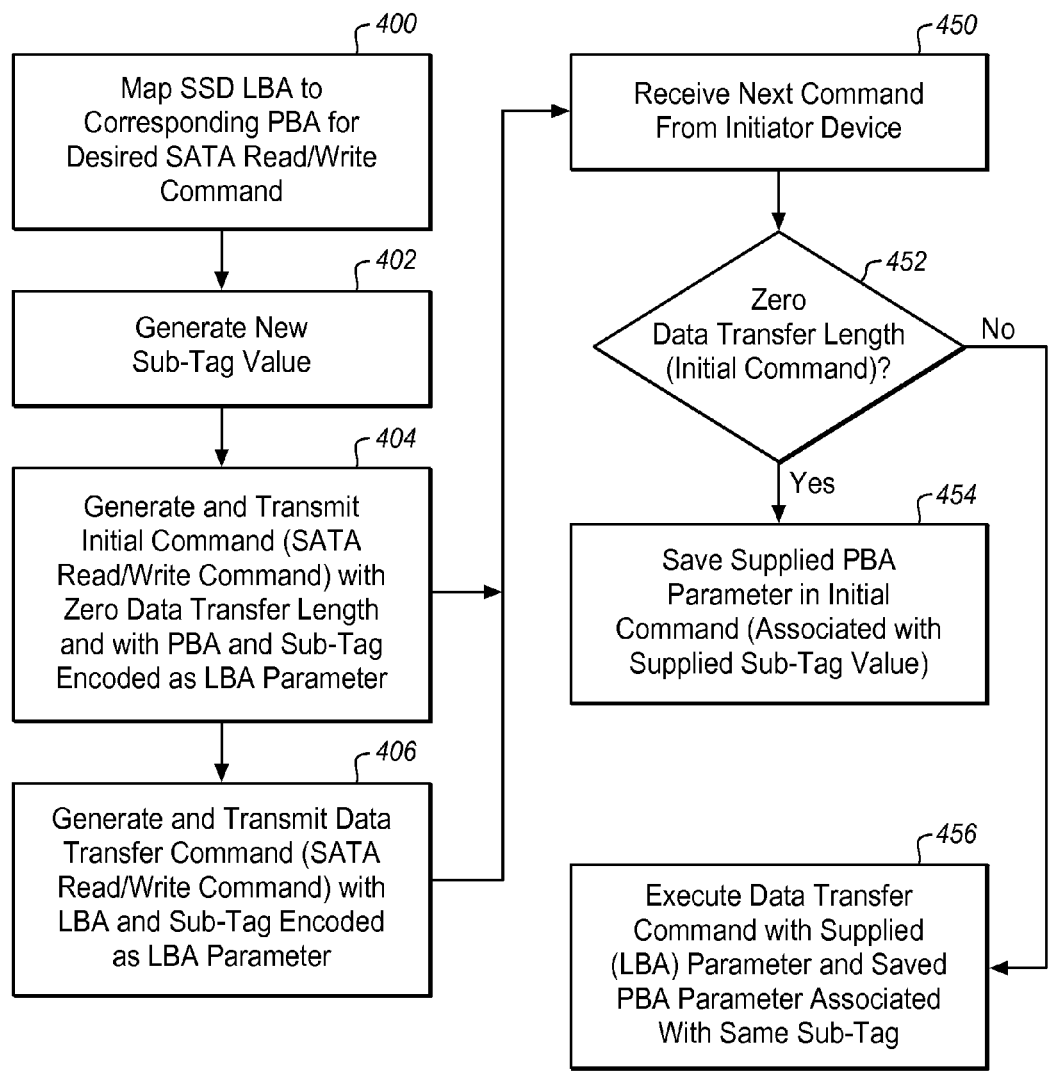

FIG. 4 is a flowchart describing another exemplary method in accordance with features and aspects hereof to provide for transmission of additional parameters for the processing of a command or message in a protocol that limits the number of such parameters that may be specified in a data transfer command. The method of FIG. 4 may be performed within a system such as system 100 of FIG. 1 and more specifically may be performed within enhanced initiator device 102 and enhanced target device 104. The method of FIG. 4 is similar to that of FIG. 3 but more specifically relates to application to a data system in which a SATA host/initiator communicates with a SATA SSD as the target device. More specifically, where an SSD relies on the attached SATA host or initiator to provide logical to physical mapping features for the SSD, the method of FIG. 4 provides for transmission of additional parameters required by such an SSD to execute a read or write data transfer command. Steps 400 through 406 are operable within a SATA initiator/host device while steps 450 through 456 are operable in an attached SATA target device (e.g. a SATA SSD). At step 400, the SATA initiator device performs appropriate logical to physical mapping processing for a SATA read or write data transfer command to be sent to the SSD. Details of such logical to physical mappings are generally known to those of ordinary skill in the art and are generally as specified by the vendor of the SSD product. In general, in some exemplary SSDs relying on an attached host for mapping services, the SSD may require not only the logical block address (LBA) and data transfer length for a SATA read or write command but may also require knowledge of the physical block address (PBA) presently associated with the corresponding LBA. In accordance with a SATA read or write command, the command is incapable of providing this additional parameter. Thus, steps 402 through 406 generate an initial command (e.g., a first command) and a data transfer command (e.g., a second command) wherein the initial command provides the additional parameter required for the execution of the desired satire read or write command by the SSD. Specifically, step 402 generates a new sub-tag value to associate the initial command and the data transfer command within the SSD. Step 404 then generates an initial command and transmits the generated initial command to the SSD target device (as indicated by the dashed line directed to step 450). In this exemplary embodiment, the initial command is distinguished from the actual data transfer command by virtue of specifying a zero data transfer length. The PBA parameter determined by the mapping operation at step 400 is encoded within the LBA parameter field of the initial command. Further, the newly generated sub-tag value may also be encoded within the LBA parameter field. The particular bits utilized within the LBA parameter field of the read or write initial command and the specific bits utilized for encoding the sub-tag value are a matter of design choice well known to those of ordinary skill in the art. For example, a portion of the LBA parameter field may be reserved for specifying the sub-tag value such that the maximum range of LBA/PBA values may be limited. At present, such a limitation is of no practical significance in present day SSD devices due to the somewhat more limited capacity of present day SSDs. Those of ordinary skill in the art world readily recognize a variety of embodiments as a matter of design choice to encode desired values within the LBA parameter field of the read or write initial commands. Step 406 then generates the desired data transfer command and transmits the generated data transfer command to the SSD target device (as indicated by the dashed line directed to step 450). The actual data transfer command is also a read or write SATA command but, in this exemplary embodiment, is distinguished from the initial command by virtue of having a non-zero data transfer length. Further, the same sub-tag value generated at step 402 and encoded within the initial command by step 404 may also be encoded within the LBA parameter field of the data transfer read/write command.

Steps 450 through 456 are performed within the SATA SSD target device responsive to receipt of the initial command and in response to receipt of the data transfer command. At step 450, the SSD target device receives a next command from the initiator (e.g., from a SATA host). Step 452 then determines whether the received command is an initial command having a zero data transfer length or an actual data transfer command (having a non-zero data transfer length). If the received command is an initial command providing additional parameters for the eventual receipt of a corresponding actual data transfer command, step 454 saves the additional parameter encoded within the received initial command (i.e., saves the PBA encoded in the LBA parameter field of the initial (read/write) command). The saved parameter is associated with a sub-tag value also encoded within the received initial command such that the specified parameter value (i.e., the PBA value) may be associated with the LBA of the corresponding data transfer command yet to be received. If step 452 determines that the received command is an actual data transfer command (e.g., a read or write command having a non-zero data transfer length,) step 456 executes the received data transfer command utilizing the LBA parameter specified within the data transfer command (in the LBA parameter field) and the saved PBA parameter encoded within previously received initial command and associated with the data transfer command by virtue of sharing a common sub-tag value.

Figure 5:
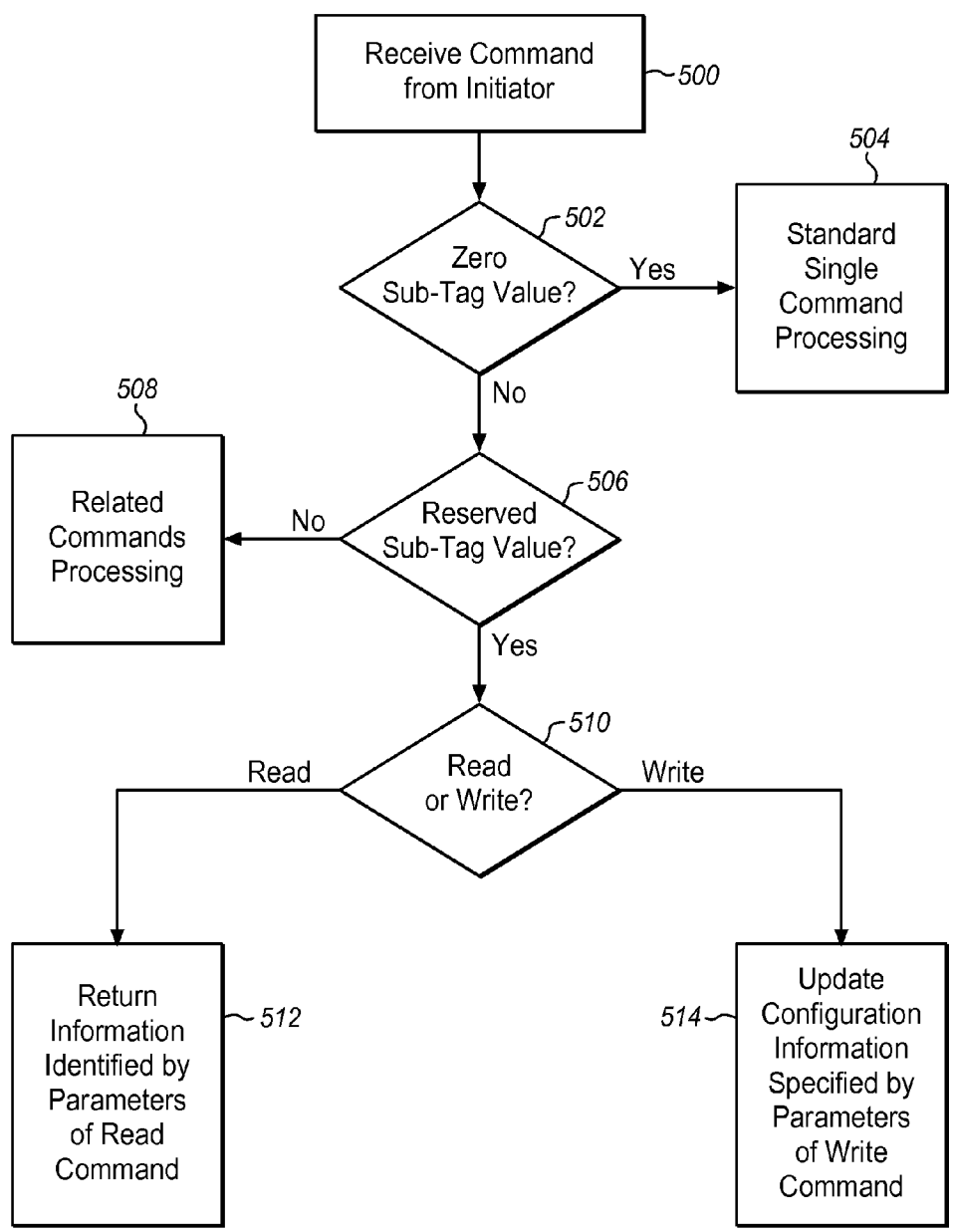
FIG. 5 is a flowchart describing an exemplary method in accordance with features and aspects hereof for exchanging status and configuration information between devices using vendor unique encoded commands based on a protocol having limited capabilities for such exchanges.

FIG. 5 is a flowchart describing another exemplary method in accordance with features and aspects hereof to provide for exchange of status and/or configuration information between devices in a protocol that limits such exchanges to pre-defined commands. The method of FIG. 5 may be performed within a system such as system 100 of FIG. 1 and more specifically may be performed within enhanced initiator device 102 and enhanced target device 104. At step 500, a target device receives a command from an initiator device. As discussed above, in accordance with features and aspects hereof the command comprises a sub-tag value encoded in bits of the command structure. For example, in the context of a SATA environment, the received command may be an NCQ read or write command with a sub-tag value encoded in designated bits of a standard parameter of the command such as the LBA parameter field. Step 502 then determines whether the sub-tag value specified in the received command is zero or non-zero. As discussed above, a zero sub-tag value indicates that the command is encoded as a standard command in the protocol (e.g., as a standard SATA read or write command that stands alone—is not related to other commands used to provide additional parameters for a later command). If the sub-tag of the received command is zero, step 504 performs normal processing of the command (e.g., normal read or write processing to manage data on a SATA storage device or any other standard command transmitted by the initiator device). Otherwise, step 506 determines whether the sub-tag value in the received command specifies a reserved value. The reserved value may be any value so defined as reserved to indicate a special purpose for exchange of administrative information. As noted above, any number of such reserved values may be defined. For example, all ones (e.g., a signed value of −1) may be used as a reserved value to indicate a request to exchange administrative information. If the sub-tag value is not a reserved value, step 508 represents processing (as described above with respect to FIGS. 2 through 4) to process the received command as one of a sequence of related commands used to pass additional parameters for a read or write operation. If step 506 determines that the received command specifies a reserved sub-tag value, step 510 next determines what kind of administrative information is to be exchanged—e.g., a read of status and/or configuration information from the target device or a write of configuration information to the target device. If the reserved sub-tag is specified in a read command, step 512 returns requested administrative information (e.g., status and/or configuration information). The particular administrative information requested to be returned may be identified by the parameters of the read command. For example, the LBA parameter of a SATA NCQ read command may encode an indicator of one or more status and/or configuration values to be returned from the target device to the initiator. If step 510 determines that the command is a SATA NCQ write command (with a reserved sub-tag value), step 514 updates the configuration information (administrative information) identified by parameters of the write command. For example, the LBA parameter of a SATA NCQ write command may encode an indicator of one or more configuration values to be updated in the target device. The LBA and/or data length parameters of the write command may also encode a new value to be used to update the identified configuration information.

Those of ordinary skill in the art will readily recognize numerous equivalent and additional steps that may be present in the methods of FIGS. 2 through 5. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:
1. A method comprising:
transmitting a command according to a protocol from an initiator device to a target device;
receiving the command in the target device;
detecting within the target device that the command comprises a reserved tag value indicating that the command includes parameters not defined by the protocol;

analyzing the parameters to identify a new configuration for the target device in response to detecting the reserved tag value; and updating the configuration of the target device to match the new configuration.

2. The method of claim 1 wherein the command comprises a Native Command Queuing (NCQ) command.

3. The method of claim 2 wherein the new configuration is stored within a Logical Block Address (LBA) parameter of the command.

4. The method of claim 2 wherein the new configuration is stored within a data length parameter of the command.

5. The method of claim 1 wherein the reserved tag value is a signed value of negative one.

6. The method of claim 1 wherein the initiator device is a Serial Advanced Technology Attachment (SATA) initiator device and the target device is a SATA target device.

7. The method of claim 6 wherein the command comprises a SATA read command, and wherein the tag value comprises a sub-tag value encoded in bits of a Logical Block Address (LBA) parameter field of the SATA read command.

8. The method of claim 6 wherein the command comprises a SATA write command, and wherein the tag value comprises a sub-tag value encoded in bits of a Logical Block Address (LBA) parameter field of the SATA write command.

9. A method operable in a Serial Advanced Technology Attachment (SATA) target device, the method comprising:

receiving a SATA read command or a SATA write command from a SATA initiator device;

detecting a reserved sub-tag value encoded within the received command indicating that the command includes parameters not defined by the SATA protocol;

responsive to detecting the reserved sub-tag value in a received SATA read command, identifying a configuration of the target device based on the parameters and transmitting a response describing the identified configuration from the target device to the initiator device; and responsive to detecting the reserved sub-tag value in a received SATA write command, analyzing the parameters to identify a new configuration for the target device and updating the configuration of the target device to match the new configuration.

10. The method of claim 9 wherein the reserved sub-tag value is encoded within a portion of a Logical Block Address (LBA) field of the received command.

11. The method of claim 9 wherein the received command is a SATA read command, and wherein the response describing the identified configuration is based on a parameter within the received SATA read command.

12. The method of claim 11 wherein the identified configuration comprises a status of the target device.

13. The method of claim 9 wherein the received command is a SATA write command, and wherein the received SATA write command comprises indicia of a configuration parameter within the target device to be changed and comprises indicia of the configuration change to be made.

14. A method comprising:

transmitting a command according to a protocol from an initiator device to a target device;

receiving the command in the target device;

detecting within the target device that the command comprises a reserved tag value indicating that the command includes parameters not defined by the protocol;

identifying a configuration of the target device based on the parameters; and transmitting a response describing the identified configuration from the target device to the initiator device.

15. The method of claim 14, comprising:

wherein the command comprises a Native Command Queuing (NCQ) command.

16. The method of claim 14, comprising:

wherein the parameters not defined by the protocol encode one or more configuration values for the target device to report to the initiator device.

* * * * *